United States Patent
Zeng et al.

(10) Patent No.: US 12,036,877 B2
(45) Date of Patent: Jul. 16, 2024

(54) BATTERY, POWER CONSUMPTION DEVICE, AND METHOD AND DEVICE FOR PRODUCING BATTERY

(71) Applicant: JIANGSU CONTEMPORARY AMPEREX TECHNOLOGY LIMITED, Jiangsu (CN)

(72) Inventors: Yuqun Zeng, Jiangsu (CN); Zhanyu Sun, Jiangsu (CN); Xiaoteng Huang, Jiangsu (CN); Haiqi Yang, Jiangsu (CN); Wenli Wang, Jiangsu (CN); Jiarong Hong, Jiangsu (CN); Langchao Hu, Jiangsu (CN)

(73) Assignee: JIANGSU CONTEMPORARY AMPEREX TECHNOLOGY LIMITED, Jiangsu (CN)

(*) Notice: Subject to any disclaimer, the term of this patent is extended or adjusted under 35 U.S.C. 154(b) by 712 days.

(21) Appl. No.: 17/138,761

(22) Filed: Dec. 30, 2020

(65) Prior Publication Data

US 2022/0118861 A1 Apr. 21, 2022

Related U.S. Application Data

(63) Continuation of application No. PCT/CN2020/121992, filed on Oct. 19, 2020.

(51) Int. Cl.
*B60L 50/64* (2019.01)
*A62C 3/07* (2006.01)
(Continued)

(52) U.S. Cl.
CPC ............... *B60L 50/64* (2019.02); *A62C 3/07* (2013.01); *B60L 58/26* (2019.02); *B60L 58/27* (2019.02)

(58) Field of Classification Search
CPC ....... H01M 50/20; H01M 50/30; H01M 10/52
See application file for complete search history.

(56) References Cited

U.S. PATENT DOCUMENTS

2003/0003350 A1 1/2003 Heimer et al.
2006/0073375 A1* 4/2006 Hong .................. H01M 50/317
429/62
(Continued)

FOREIGN PATENT DOCUMENTS

CN 1306679 A 8/2001
CN 205508970 U 8/2016
(Continued)

OTHER PUBLICATIONS

Extended European Search Report dated Apr. 7, 2022 received in European Patent Application No. EP 20827955.4.
(Continued)

*Primary Examiner* — Olatunji A Godo
(74) *Attorney, Agent, or Firm* — Scully, Scott, Murphy & Presser, P.C.

(57) ABSTRACT

Embodiments of the present application relates to a battery, a power consumption device, and a method and device for producing a battery. The battery includes: a battery cell, the battery cell including a pressure relief mechanism; a fire-fighting pipeline configured to accommodate a fire-fighting medium, the fire-fighting pipeline including a first region corresponding to the pressure relief mechanism and a second region located at a periphery of the first region, the first region being configured to be damaged when the pressure relief mechanism is actuated, such that the fire-fighting medium is discharged; and a protective component disposed between the fire-fighting pipeline and the battery cell and configured to protect the second region. The battery, the power consumption device, and the method and device for (Continued)

producing the battery in the embodiments of the present application could improve the safety performance of the battery.

15 Claims, 7 Drawing Sheets

(51) Int. Cl.
    *B60L 58/26*     (2019.01)
    *B60L 58/27*     (2019.01)

(56) References Cited

U.S. PATENT DOCUMENTS

| | | |
|---|---|---|
| 2006/0255764 A1 | 11/2006 | Cho |
| 2010/0136391 A1 | 6/2010 | Prilutsky et al. |
| 2011/0177382 A1 | 7/2011 | Kim |
| 2012/0114993 A1 | 5/2012 | Park et al. |
| 2014/0170447 A1 | 6/2014 | Woehrle et al. |
| 2014/0242424 A1 | 8/2014 | Jones |
| 2015/0287963 A1 | 10/2015 | Chiba |
| 2017/0256764 A1 | 9/2017 | Li |
| 2018/0138478 A1 | 5/2018 | Chan |
| 2019/0348649 A1 | 11/2019 | Ryu et al. |
| 2020/0058967 A1 | 2/2020 | Berge et al. |
| 2020/0212524 A1 | 7/2020 | Wang et al. |
| 2020/0212526 A1 | 7/2020 | Wu et al. |
| 2021/0016668 A1 | 1/2021 | Nakahara et al. |
| 2021/0075075 A1 | 3/2021 | Kim et al. |
| 2021/0113871 A1 | 4/2021 | Huang et al. |
| 2022/0118861 A1 | 4/2022 | Zeng et al. |
| 2022/0123430 A1 | 4/2022 | Liang et al. |
| 2022/0311086 A1 | 9/2022 | Wu et al. |
| 2023/0223650 A1 | 7/2023 | Zhao et al. |

FOREIGN PATENT DOCUMENTS

| | | |
|---|---|---|
| CN | 205542977 U | 8/2016 |
| CN | 205583008 U | 9/2016 |
| CN | 106356579 A | 1/2017 |
| CN | 106450575 A | 2/2017 |
| CN | 106785182 A | 5/2017 |
| CN | 106960977 A | 7/2017 |
| CN | 206834290 U | 1/2018 |
| CN | 107910606 A | 4/2018 |
| CN | 107994175 A | 5/2018 |
| CN | 108075086 A | 5/2018 |
| CN | 207441811 U | 6/2018 |
| CN | 207474504 U | 6/2018 |
| CN | 207474524 U | 6/2018 |
| CN | 207886552 U | 9/2018 |
| CN | 207909930 U | 9/2018 |
| CN | 207967074 U | 10/2018 |
| CN | 207977389 U | 10/2018 |
| CN | 108922998 A | 11/2018 |
| CN | 109244349 A | 1/2019 |
| CN | 208478517 U | 2/2019 |
| CN | 208955153 U | 6/2019 |
| CN | 209071461 U | 7/2019 |
| CN | 209104233 U | 7/2019 |
| CN | 110148694 A | 8/2019 |
| CN | 209249563 U | 8/2019 |
| CN | 110212265 A | 9/2019 |
| CN | 209344171 U | 9/2019 |
| CN | 209401662 U | 9/2019 |
| CN | 209490404 U | 10/2019 |
| CN | 110459719 A | 11/2019 |
| CN | 209592146 U | 11/2019 |
| CN | 209662489 U | 11/2019 |
| CN | 209804782 U | 12/2019 |
| CN | 110868645 A | 3/2020 |
| CN | 110875443 A | 3/2020 |
| CN | 210403875 U | 4/2020 |
| CN | 111106276 A | 5/2020 |
| CN | 210535738 U | 5/2020 |
| CN | 210668459 U | 6/2020 |
| CN | 210723159 U | 6/2020 |
| CN | 211088371 U | 7/2020 |
| CN | 111509163 A | 8/2020 |
| CN | 111509326 A | 8/2020 |
| CN | 111584792 A | 8/2020 |
| CN | 111725454 A | 9/2020 |
| CN | 111742440 A | 10/2020 |
| CN | 211700415 U | 10/2020 |
| DE | 10 2011 075 318 A1 | 11/2012 |
| DE | 102011109249 A1 | 2/2013 |
| EP | 3 333 932 A1 | 6/2018 |
| EP | 3940860 A1 | 1/2022 |
| JP | H04349342 A | 12/1992 |
| JP | H6349521 A | 12/1994 |
| JP | 2008251263 A | 10/2008 |
| JP | 2010153141 A | 7/2010 |
| JP | 2012018766 A | 1/2012 |
| JP | 2012094313 A | 5/2012 |
| JP | 2014049427 A | 3/2014 |
| JP | 2014103051 A | 6/2014 |
| JP | 2014110138 A | 6/2014 |
| JP | 2015046354 A | 3/2015 |
| JP | 2017-147128 A | 8/2017 |
| JP | 2017139099 A | 8/2017 |
| JP | 2017152213 A | 8/2017 |
| JP | 2018018753 A | 2/2018 |
| JP | 2018045891 A | 3/2018 |
| JP | 2018116813 A | 7/2018 |
| JP | 2019-029245 A | 2/2019 |
| JP | 2019029245 A | 2/2019 |
| JP | 2019149291 A | 9/2019 |
| WO | 2005114811 A2 | 12/2005 |
| WO | 2013017204 A1 | 2/2013 |
| WO | 2020204901 A1 | 10/2020 |

OTHER PUBLICATIONS

Notice of Reasons for Refusal dated Mar. 18, 2024 received in Japanese Patent Application No. JP 2023-509570.
Office Action dated Mar. 13, 2024 received in U.S. Appl. No. 18/175,248.
Office Action dated Aug. 16, 2023 received in U.S. Appl. No. 18/295,151.
Office Action dated Feb. 13, 2023 received in U.S. Appl. No. 17/138,818.
Notice of Allowance dated Sep. 6, 2023 received in U.S. Appl. No. 17/138,818.
Extended European Search Report dated Mar. 30, 2023 received in European Patent Application No. EP 20957981.2.
Extended European Search Report dated Jul. 24, 2023 received in European Patent Application No. EP 20957979.6.
Extended European Search Report dated Feb. 10, 2022 received in European Patent Application No. EP 20827972.9.
Communication under Rule 71(3) EPC dated Jul. 28, 2022 received in European Patent Application No. EP 20827972.9.
First Office Action dated Dec. 7, 2020 received in Chinese Patent Application No. CN 202011121540.7.
Second Office Action dated Dec. 8, 2020 received in Chinese Patent Application No. CN 202011120261.9.
Notice of Reasons for Refusal dated Sep. 4, 2023 received in Japanese Patent Application No. JP 2022-544802.
First Office Action dated Jan. 11, 2022 received in Chinese Patent Application No. CN 202110210133.1.
First Office Action dated Nov. 23, 2020 received in Chinese Patent Application No. CN 202011120255.3.
First Office Action dated Dec. 7, 2020 received in Chinese Patent Application No. CN 202011121539.4.
International Search Report and Written Opinion dated Jul. 20, 2021 received in International Application No. PCT/CN2020/121990.
International Search Report and Written Opinion dated Jul. 20, 2021 received in International Application No. PCT/CN2020/121999.
International Search Report and Written Opinion dated Jul. 20, 2021 received in International Application No. PCT/CN2020/122000.

(56) References Cited

OTHER PUBLICATIONS

International Search Report and Written Opinion dated Jul. 22, 2021 received in International Application No. PCT/CN2020/122001.
First Office Action dated Jun. 14, 2022 received in Chinese Patent Application No. CN 202011121541.1.
Extended European Search Report dated Dec. 11, 2023 received in European Patent Application No. EP 20957980.4.
Notice of Reasons for Refusal dated Feb. 26, 2024 received in Japanese Patent Application No. JP 2023-506304.
Notice of Allowance dated Feb. 7, 2024 received in Korean Patent Application No. KR 10-2023-7001610.
Decision to Grant a Patent dated Mar. 4, 2024 received in Japanese Patent Application No. JP 2023-506541.

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2020/121992, filed on Oct. 19, 2020, the disclosure of which is hereby incorporated by reference in its entirety.

TECHNICAL FIELD

The present application relates to the field of energy storage devices, and in particular to a battery, a power consumption device, and a method and device for producing a battery.

BACKGROUND

Energy saving and emission reduction are the key to the sustainable development of the automotive industry. In this case, electric vehicles have become an important part of the sustainable development of the automotive industry due to their advantages of energy saving and environmental-friendliness. For the electric vehicles, the battery technology is an important factor for their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

The present application provides a battery, a power consumption device, and a method and device for producing a battery, which could improve the safety performance of the battery.

In a first aspect, a battery is provided, and the battery includes: a battery cell, the battery cell including a pressure relief mechanism, the pressure relief mechanism configured to be actuated when an internal pressure or temperature of the battery cell reaches a threshold, to relieve the internal pressure or temperature; a fire-fighting pipeline configured to accommodate a fire-fighting medium, the fire-fighting pipeline including a first region corresponding to the pressure relief mechanism and a second region located at a periphery of the first region, the first region being configured to be damaged when the pressure relief mechanism is actuated, such that the fire-fighting medium is discharged, and the second region being configured to remain intact when the pressure relief mechanism is actuated, such that the fire-fighting medium is capable of flowing from the second region to the first region; and a protective component disposed between the fire-fighting pipeline and the battery cell and configured to protect the second region.

Therefore, the battery of an embodiment of the present application may include one or more battery cells, the battery cell is provided with a pressure relief mechanism, and the pressure relief mechanism may be actuated when an internal temperature or pressure of the battery cell exceeds a threshold, to relieve the internal pressure or temperature; a fire-fighting pipeline is provided at a position corresponding to the pressure relief mechanism, and when the pressure relief mechanism is actuated, emissions discharged from the pressure relief mechanism may damage the fire-fighting pipeline, so that a fire-fighting medium accommodated in the fire-fighting pipeline flows out from a damaged position and flows to the pressure relief mechanism so as to lower a temperature of the battery cell; meanwhile, a protective component is provided between the fire-fighting pipeline and the battery cell, and the protective component may protect a second region on the fire-fighting pipeline located at a periphery of a first region corresponding to the pressure relief mechanism, so that the pressure relief mechanism only damages the first region of the fire-fighting pipeline corresponding to the pressure relief mechanism, and further, a position where the fire-fighting medium in the fire-fighting pipeline flows out is concentrated in a position corresponding to the pressure relief mechanism, in this way, the heat dissipation efficiency of the battery cell could be improved, and the fire-fighting medium in the fire-fighting pipeline could be more effectively utilized.

In some embodiments, the protective component is disposed between the second region of the fire-fighting pipeline and the battery cell, and the protective component is configured to protect the second region when the pressure relief mechanism is actuated.

That is, the protective component may be disposed only at the second region, for example, the second region may be wrapped by the protective component, and in this way the protective component may include a plurality of separate structures, which saves an installation space.

In some embodiments, the protective component includes a protective zone and a weakened zone, the protective zone is configured to protect the second region of the fire-fighting pipeline when the pressure relief mechanism is actuated, the weakened zone is disposed opposite to the pressure relief mechanism, and the weakened zone is configured such that emissions from the battery cell are capable of passing through the weakened zone to damage the first region when the pressure relief mechanism is actuated.

If the protective component is set as a plurality of separate structures, it is time-consuming to respectively install the protective components in each second region. Therefore, the protective component may be set as an integral component, and a weakened zone corresponding to the pressure relief mechanism is provided on the protective component, so that when the pressure relief mechanism is actuated, the first region may be damaged through the weakened zone and a protective zone except the weakened zone may protect the second region from being damaged.

In some embodiments, a first recess is provided on the protective component, the fire-fighting pipeline is disposed in the first recess, and the first recess is configured to collect the fire-fighting medium used to flow into the battery cell when the pressure relief mechanism is actuated.

A recess on the protective component may fix the fire-fighting pipeline and collect and guide the fire-fighting medium to flow into the battery cell.

In some embodiments, the weakened zone is provided in a region on a bottom wall of the first recess corresponding to the first region.

In some embodiments, a width of the weakened zone in a first direction is greater than or equal to a width of the bottom wall of the first recess in the first direction, and the first direction is perpendicular to an axis of the fire-fighting pipeline in the first region.

In some embodiments, a width of the weakened zone in a first direction is greater than a diameter of the fire-fighting pipeline, and the first direction is perpendicular to an axis of the fire-fighting pipeline in the first region.

In some embodiments, an orthographic projection of the weakened zone on a first plane covers an orthographic projection of the pressure relief mechanism on the first plane, and the first plane is parallel to a surface of a wall where the pressure relief mechanism of the battery cell is located facing toward an interior of the battery cell.

With the foregoing arrangement, the emissions discharged when the pressure relief mechanism is actuated can quickly and effectively break through the corresponding first region.

In some embodiments, the fire-fighting pipeline is disposed on one side of the pressure relief mechanism away from an interior of the battery cell.

In some embodiments, the pressure relief mechanism is an axisymmetric structure, and an axis of the fire-fighting pipeline in the first region is perpendicular to and lies in a same plane as an axis of the pressure relief mechanism.

In some embodiments, a melting point of a material of the protective component is greater than a melting point of a material of the fire-fighting pipeline.

In some embodiments, a melting point of a material of the protective component is greater than or equal to 800° C.

Considering that a temperature of the emissions discharged from the pressure relief mechanism is high, a material with a high melting point should be selected for the protective component.

In some embodiments, a material of the protective component is mica or quartz.

In some embodiments, the battery further includes: a bus component configured to implement electrical connection of a plurality of battery cells; and an insulating protective layer configured to cover the bus component to prevent emissions from the battery cell from short-circuiting the plurality of the battery cells when the pressure relief mechanism is actuated, and a thickness of the insulating protective layer is greater than 0.1 mm.

In some embodiments, a melting point of a material of the insulating protective layer is greater than or equal to 800° C.

In some embodiments, a material of the insulating protective layer is mica or quartz.

In some embodiments, the battery further includes: an insulating layer disposed between the pressure relief mechanism and the protective component. In this way, insulation between the battery cells can be implemented.

In some embodiments, the insulating layer is configured to wrap the bus component of the battery, and an insulating protective layer is provided in a region on a surface of the insulating layer corresponding to the bus component, where the bus component is configured to implement electrical connection of a plurality of battery cells, and the insulating protective layer is configured to cover the bus component to prevent emissions from the battery cell from short-circuiting the plurality of the battery cells when the pressure relief mechanism is actuated.

In some embodiments, the protective component and the insulating protective layer are an integrally formed structure.

In some embodiments, a second recess is provided in a region of the insulating layer corresponding to the pressure relief mechanism, and the protective component is disposed in the second recess.

In some embodiments, a first recess on the protective component is disposed in the second recess, the fire-fighting pipeline is disposed in the first recess, and the first recess is configured to collect the fire-fighting medium used to flow into the battery cell when the pressure relief mechanism is actuated.

With a recess provided on the insulating layer, it is convenient to install and fix the protective component and the fire-fighting pipeline, and it is easy to realize that positions of the protective component and the fire-fighting pipeline correspond to a position of the pressure relief mechanism.

In some embodiments, a fixing member is provided in the second recess, and the fixing member is configured to fix the protective component and the fire-fighting pipeline.

In some embodiments, a melting point of a material of the insulating layer is lower than a melting point of the protective component, and the insulating layer is melted by emissions from the battery cell when the pressure relief mechanism is actuated.

In order to enable the emissions discharged when the pressure relief mechanism is actuated to break through the corresponding first region quickly and effectively, a material with a lower melting point should be selected as a material of the insulating layer, so that the insulating layer can be quickly melted by the emissions.

In a second aspect, a power consumption device is provided, including the battery according to the first aspect or any one of the embodiments of the first aspect.

In some embodiments, the power consumption device is a vehicle, a ship or a spacecraft.

In a third aspect, a method for producing a battery is provided, including providing a battery cell, the battery cell including a pressure relief mechanism, the pressure relief mechanism configured to be actuated when an internal pressure or temperature of the battery cell reaches a threshold, to relieve the internal pressure or temperature; providing a fire-fighting pipeline, the fire-fighting pipeline being configured to accommodate a fire-fighting medium, the fire-fighting pipeline including a first region corresponding to the pressure relief mechanism and a second region located at a periphery of the first region, the first region being configured to be damaged when the pressure relief mechanism is actuated, such that the fire-fighting medium is discharged, and the second region being configured to remain intact when the pressure relief mechanism is actuated, such that the fire-fighting medium is capable of flowing from the second region to the first region; and providing a protective component, the protective component being disposed between the fire-fighting pipeline and the battery cell, and the protective component being configured to protect the second region.

In some embodiments, the protective component is disposed between the second region of the fire-fighting pipeline and the battery cell, and the protective component is configured to protect the second region when the pressure relief mechanism is actuated.

In some embodiments, the protective component includes a protective zone and a weakened zone, the protective zone is configured to protect the second region of the fire-fighting pipeline when the pressure relief mechanism is actuated, the weakened zone is disposed opposite to the pressure relief mechanism, and the weakened zone is configured such that emissions from the battery cell are capable of passing through the weakened zone to damage the first region when the pressure relief mechanism is actuated.

In some embodiments, a first recess is provided on the protective component, the fire-fighting pipeline is disposed in the first recess, and the first recess is configured to collect the fire-fighting medium used to flow into the battery cell when the pressure relief mechanism is actuated.

In a fourth aspect, a device for producing a battery is provided, including a module for executing the method provided in the foregoing third aspect.

DESCRIPTION OF EMBODIMENTS

Figure 1:
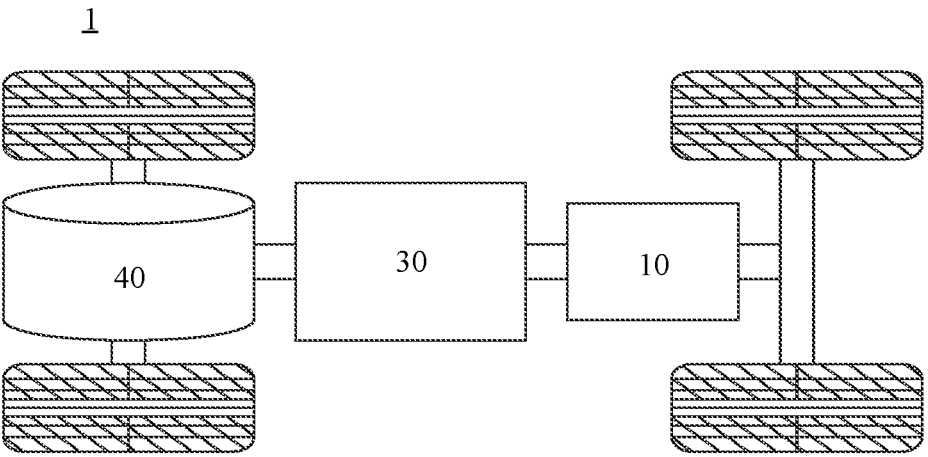
FIG. 1 is a schematic diagram of a vehicle according to an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid or in another shape, which is not limited by the embodiment of the present application. The battery cells are generally divided into three types according to the way of packaging: cylindrical battery cells, prismatic battery cells and pouch battery cells, which is not limited by the embodiment of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a case for enclosing one or more battery cells. The case can prevent a liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum, and the positive active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a winding structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated when an internal pressure or temperature of the battery cell reaches a predetermined threshold, to relieve the internal pressure or temperature. The threshold design is different according to different design requirements. The threshold may depend on the material of one or more of the positive electrode sheet, the negative electrode sheet, the electrolytic solution and the isolation film in the battery cell. The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell can be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the isolation film, high-temperature and high-pressure gases generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. The high-temperature and high-pressure emissions are discharged along a direction of the pressure relief mechanism provided in the battery cell, and more specifically, may be discharged along a direction of a region where the pressure relief mechanism is actuated. The strength and destructive power of such emissions may be great, or may even be enough to break through one or more structures along this direction, causing further safety problems.

In view of this, an embodiment of the present application provides a technical solution in which a fire-fighting pipeline is provided at a corresponding position of the pressure relief mechanism of the battery cell, and emissions discharged from the battery cell when the pressure relief mechanism is actuated are used to pass through and damage the fire-fighting pipeline, so that the fire-fighting medium in the fire-fighting pipeline is discharged from a damaged position of the fire-fighting pipeline, to cool and lower a temperature of the emissions discharged from the pressure relief mechanism, thereby reducing the risk resulting from the emissions and enhancing the safety of the battery.

The fire-fighting pipeline in an embodiment of the present application is configured to accommodate a fire-fighting medium, the fire-fighting medium here may be a fluid, and the fluid may be a liquid or gas. In the case where the pressure relief mechanism does not damage the fire-fighting pipeline, the fire-fighting pipeline may not accommodate any substance, but in the case where the pressure relief mechanism is actuated, the fire-fighting medium may be accommodated in the fire-fighting pipeline, for example, the fire-fighting medium may be controlled to enter the fire-fighting pipeline by opening and closing a valve. Or, in the case where the pressure relief mechanism is not damaged, the fire-fighting medium may always be accommodated in the fire-fighting pipeline, and the fire-fighting medium may also be used for adjusting the temperature of the battery cell. Temperature adjustment means heating or cooling a plurality of battery cells. In the case of cooling or lowering the temperature of the battery cells, the fire-fighting pipeline is configured to accommodate a cooling fluid to lower the temperature of the plurality of battery cells. In this case, the fire-fighting pipeline may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas. Optionally, the fire-fighting medium can flow in a circulating manner to achieve better temperature adjustment effects. Optionally, the fire-fighting medium may be water, a mixture of water and ethylene glycol, or air, etc.

The case of the battery in an embodiment of the present application is configured to accommodate the plurality of battery cells, the bus component and other components of the battery. In some embodiments, a structure configured to fix the battery cells may also be provided in the case. The shape of the case may be determined according to the plurality of battery cells accommodated therein. In some embodiments, the case may be a cube with six walls.

The bus component mentioned in the present application is configured to implement the electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Corresponding to the "high-voltage chamber", the electrical connection formed by the bus component may also be called "high-voltage connection".

It should be understood that each component in the case of the battery described above should not be construed as a limitation of the embodiment of the present application, that is, the case of the battery according to the embodiment of the present application may or may not include the foregoing components.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing devices, but also applicable to all devices using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery 10 may also be called a battery pack. Optionally, the plurality of battery cells may be first connected in series, in parallel or in series and parallel to form battery modules, and then the multiple battery modules are connected in series, in parallel or in series and parallel to form a battery 10. That is, a plurality of battery cells may directly form a battery 10, or may first form battery modules, and then the battery modules form a battery 10.

Figure 2:
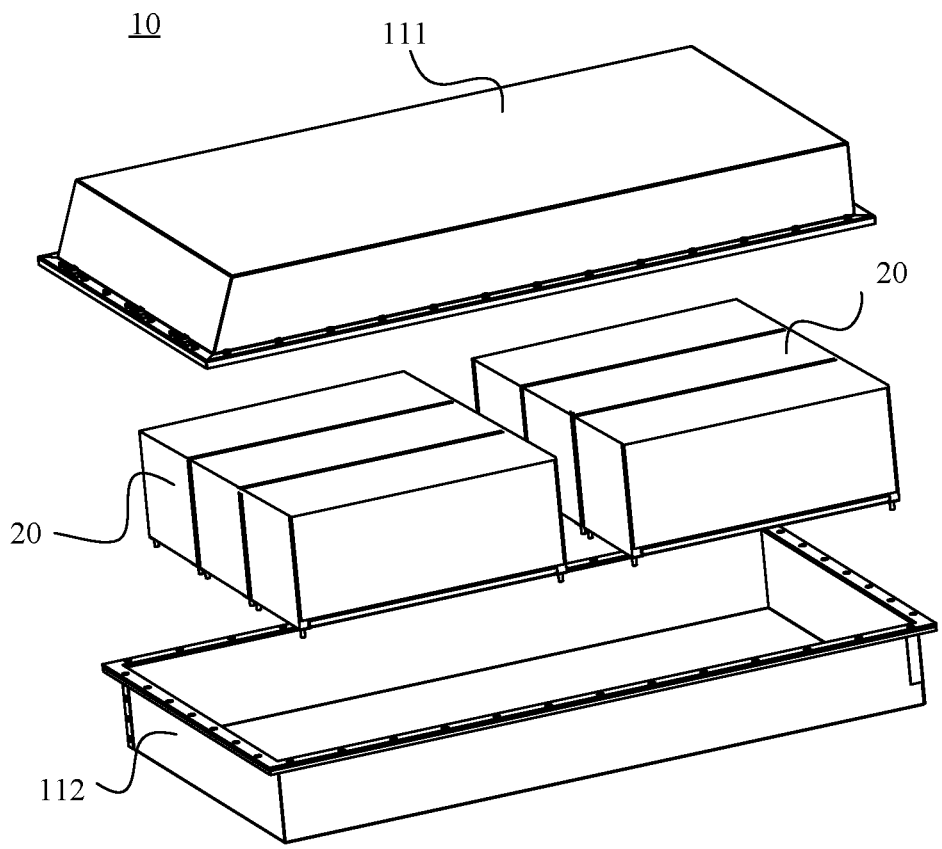
FIG. 2 is a schematic structural diagram of a battery according to an embodiment of the present application.

For example, as shown in FIG. 2, which is a schematic structural diagram of a battery 10 according to an embodiment of the present application, the battery 10 may include a plurality of battery cells 20. The battery 10 may further include a case (or a covering) with the interior thereof being a hollow structure, and the plurality of battery cells 20 are accommodated in the case. As shown in FIG. 2, the case may include two portions, which are respectively referred to as a first portion 111 and a second portion 112, respectively, and the first portion 111 and the second portion 112 are fastened together. The shapes of the first portion 111 and the second portion 112 may be determined according to the shape of the combined plurality of battery cells 20, and the first portion 111 and the second portion 112 may each have an opening. For example, the first portion 111 and the second portion 112 each may be a hollow cuboid and each have only one surface with an opening, and the opening of the first portion 111 is arranged opposite to the opening of the second portion 112. The first portion 111 and the second portion 112 are fastened to each other to form a case with a closed chamber. The plurality of battery cells 20 are combined in parallel connection or series connection or series-parallel connection and are then placed in the case formed by fastening the first portion 111 to the second portion 112.

Optionally, the battery 10 may also include other structures. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

Figure 3:
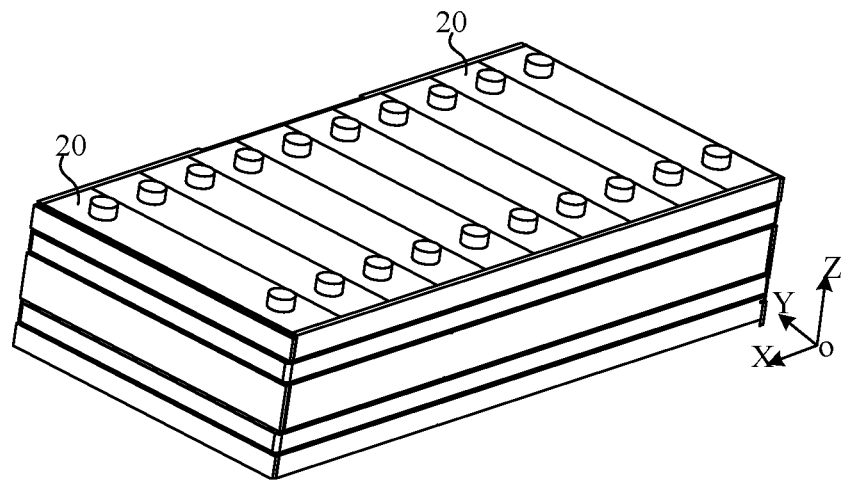
FIG. 3 is a structural schematic diagram of a battery module according to an embodiment of the present application.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel.

Figure 4:
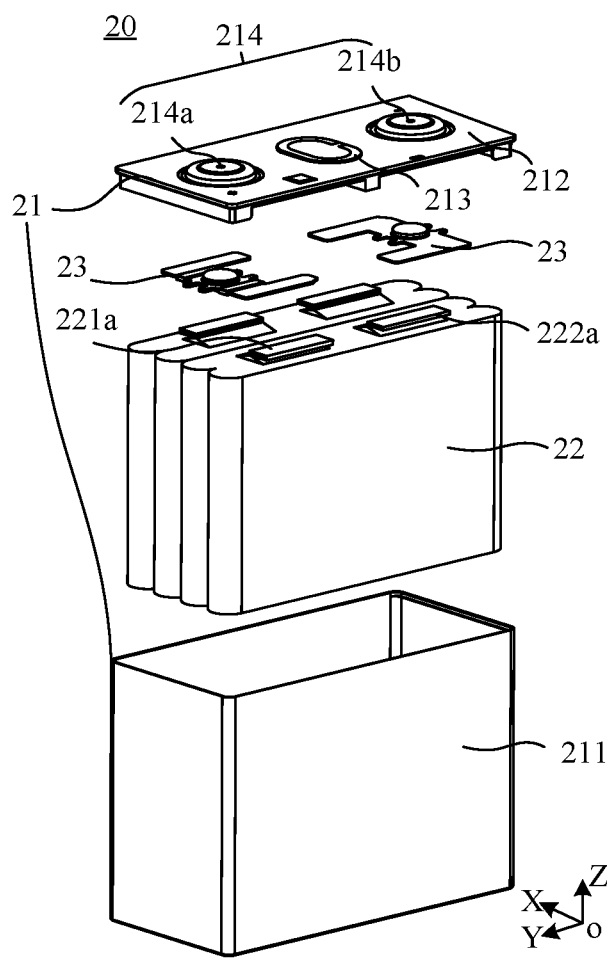
FIG. 4 is an exploded view of a battery cell according to an embodiment of the present application.

The following is a detailed description of any battery cell 20. FIG. 4 is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, for example, a positive electrode terminal; and the second electrode tab 222a of one or more electrode assemblies 22 is connected to the other electrode terminal via the other connecting member 23 for example, a negative electrode terminal. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

A pressure relief mechanism 213 may also be provided on the battery cell 20. The pressure relief mechanism is configured to be actuated when an internal pressure or temperature of the battery cell 20 reaches a threshold, to relieve the internal pressure or temperature.

The pressure relief mechanism 213 may have various possible pressure relief structures, which is not limited by the embodiment of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Considering that high-temperature emissions are discharged when the pressure relief mechanism 213 is actuated, in order to reduce the damage of the emissions to other structures, a fire-fighting pipeline may be provided at a corresponding position of the pressure relief mechanism 213 of the battery cell 20. For example, the fire-fighting pipeline may be provided in a direction where the emissions eject, which can directly face or not directly face the pressure relief mechanism 213, so that the fire-fighting pipeline has a place where it can be in contact with the emissions and a position where it can be damaged; and meanwhile, after the fire-fighting pipeline is damaged, the fire-fighting medium can flow from the damaged position to the battery cell 20. In this way, the emissions discharged from the battery cell 20 when the pressure relief mechanism 213 is actuated are used to pass through and damage the fire-fighting pipeline, so that the fire-fighting medium in the fire-fighting pipeline cools and lowers the temperature of the emissions discharged from the pressure relief mechanism 213, thereby reducing the risk resulting from the emissions and enhancing the safety of the battery 10.

When thermal runaway occurs inside a certain battery cell 20 so that the pressure relief mechanism 213 is activated, in order to enable the emissions discharged from the pressure relief mechanism 213 to successfully eject and penetrate the fire-fighting pipeline at the corresponding position, a melting point of the fire-fighting pipeline is usually set low so that the fire-fighting pipeline is easy to be melted; however, the emissions of the pressure relief mechanism 213 eject in a flared shape, this leads to a large range of the fire-fighting pipeline to be melted, for example, it is much larger than a range corresponding to the pressure relief mechanism 213, and then most of the fire-fighting medium accommodated in the fire-fighting pipeline probably flows to an exterior of the battery cell 20 where thermal runaway occurs, which will cause that the temperature of the battery cell 20 where thermal runaway occurs cannot be lowered quickly. Therefore, an embodiment of the present application provides a battery, which could solve the problems mentioned above.

Figure 5:
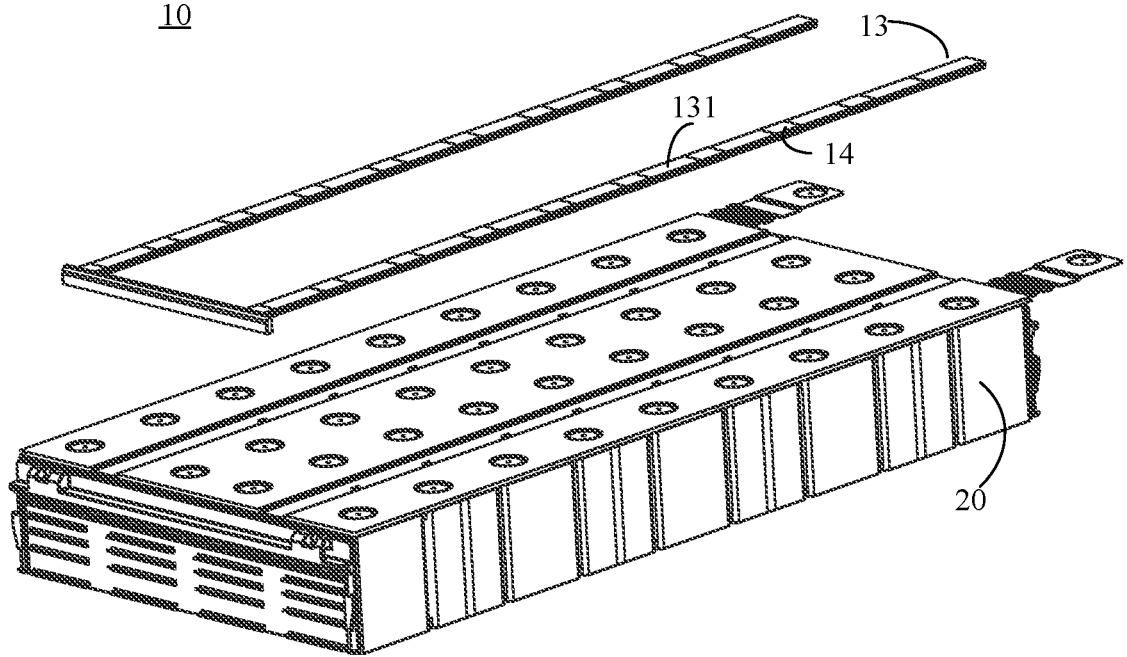
FIGS. 5 and 6 are schematic exploded views of a battery according to an embodiment of the present application.

FIG. 5 shows a schematic exploded view of a battery 10 according to an embodiment of the present application. Specifically, as shown in FIG. 5, the battery 10 may include a battery cell 20, and each battery 10 may include at least one battery cell 20, for example, in FIG. 5, the case where the battery 10 includes 2*9 battery cells 20 is taken as an example. For any one of battery cells 20, the battery cell 20 may include a pressure relief mechanism 213 (not shown in FIG. 5), and the pressure relief mechanism is configured to be actuated when an internal pressure or temperature of the battery cell 20 reaches a threshold, to relieve the internal pressure or temperature.

Optionally, the pressure relief mechanism 213 may be disposed at any position of the battery cell 20. It is assumed here that the battery cell 20 is a cuboid as shown in FIG. 5, the pressure relief mechanism 213 may be disposed on any one wall of the cuboid. For example, the pressure relief mechanism 213 may be disposed on the uppermost wall of each battery cell 20 in FIG. 5, that is, the pressure relief mechanism 213 and an electrode terminal of the battery cell 20 may be disposed on the same wall. For ease of description, in the embodiment of the present application, the case where a structure that the pressure relief mechanism 213 and the electrode terminal of the battery cell 20 are disposed on the same wall is taken as an example for description.

It should be understood that the battery 10 shown in FIG. 5 may correspond to the battery 10 shown in FIG. 2 and be applicable to the related description of the battery 10 shown in FIG. 2, for example, the battery 10 shown in FIG. 5 may also include a case and other components. The battery cell 20 included in the battery 10 shown in FIG. 5 may correspond to the battery cell 20 shown in FIGS. 3 and 4, and may be applicable to the related descriptions of the battery cell 20 shown in FIGS. 3 and 4, for example, the pressure relief mechanism 213 included in the battery cell 20 shown in FIG. 5 may correspond to the pressure relief mechanism 213 shown in FIG. 4, which will not be repeated here for brevity.

Figure 7:
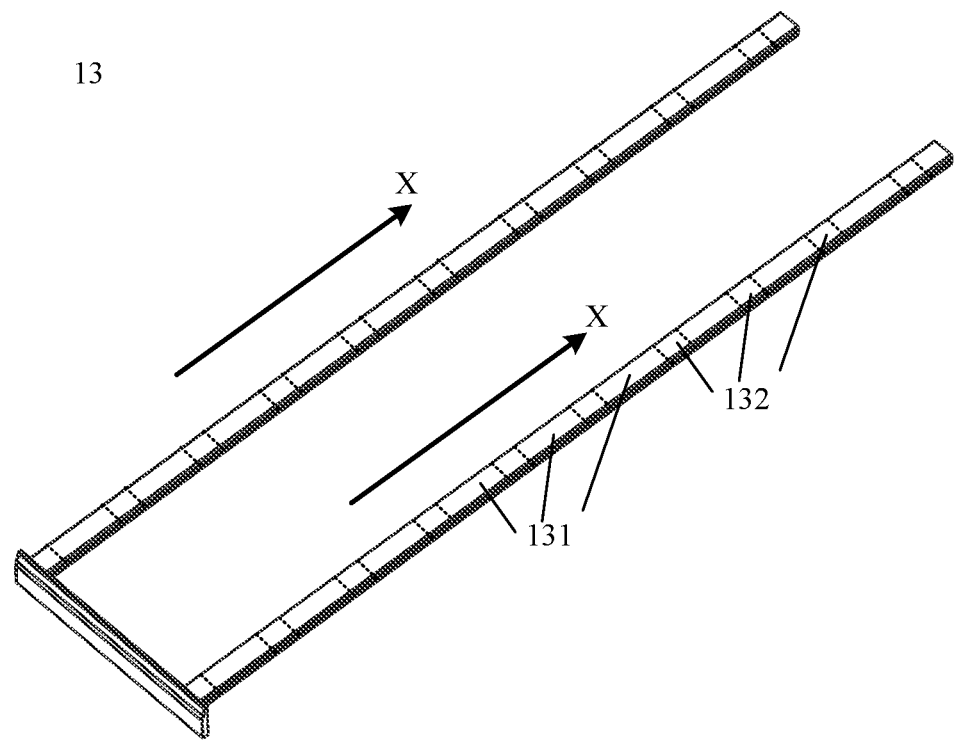
FIG. 7 is a schematic diagram of a fire-fighting pipeline according to an embodiment of the present application.

In addition, as shown in FIG. 5, the battery 10 in the embodiment of the present application may further include a fire-fighting pipeline 13 configured to accommodate a fire-fighting medium. The fire-fighting pipeline 13 may be damaged when the pressure relief mechanism 213 is actuated, so that the fire-fighting medium accommodated therein can be discharged, and the fire-fighting medium may achieve quick cooling and temperature reduction. FIG. 7 shows a schematic diagram of the fire-fighting pipeline 13 shown in FIG. 5. As shown in FIG. 5 and FIG. 7, the fire-fighting pipeline 13 may include a first region 131 and a second region 132. The first region 131 is disposed corresponding to the pressure relief mechanism 213, so that when the pressure relief mechanism 213 is actuated, the first region 131 can be damaged by emissions from the battery cell 20. The second region 132 is located at the periphery of the first region 131. For example, as shown in FIGS. 5 and 7, the first region 131 is a segment of pipeline on the fire-fighting pipeline corresponding to the pressure relief mechanism 213 or a part of region toward the pressure relief mechanism 213, and the second regions 132 are two segments of pipelines adjacent to the first region 131 on two sides of the first region 131 or a part of region of the two segments of pipelines adjacent to the first region 131 toward the battery cell 20. The first region 131 is configured to be damaged when the pressure relief mechanism 213 is actuated, such that the fire-fighting medium is discharged, and the second region 132 is configured to remain intact when the pressure relief mechanism 213 is actuated, such that the fire-fighting medium is capable of flowing from the second region 132 to the first region 131.

The battery 10 in the embodiment of the present application further includes a protective component 14, which is disposed between the fire-fighting pipeline 13 and the battery cell 20 and is configured to protect the second region 132, such that the second region 132 remains intact when the pressure relief mechanism 213 is actuated.

Therefore, the battery 10 of an embodiment of the present application may include one or more battery cells 20, the battery cell 20 is provided with a pressure relief mechanism 213, and the pressure relief mechanism 213 may be actuated when an internal temperature or pressure of the battery cell 20 exceeds a threshold, to relieve the internal pressure or temperature; a fire-fighting pipeline 13 is provided at a position corresponding to the pressure relief mechanism 213, and when the pressure relief mechanism 213 is actuated, emissions discharged from the pressure relief mechanism 213 may damage the fire-fighting pipeline 13, so that a fire-fighting medium accommodated in the fire-fighting pipeline 13 flows out and flows to the pressure relief mechanism 213 so as to lower a temperature of the battery cell 20; meanwhile, a protective component 14 is provided between the fire-fighting pipeline 13 and the battery cell 20, and the protective component 14 may protect a second region 132 on the fire-fighting pipeline 13 located at a periphery of a first region 131 corresponding to the pressure relief mechanism 13, so that the pressure relief mechanism only damages the first region 131 of the fire-fighting pipeline 13 corresponding to the pressure relief mechanism 213, and further a position where the fire-fighting medium in the fire-fighting pipeline 13 flows out is concentrated in a position corresponding to the pressure relief mechanism 213, in this way, the heat dissipation efficiency of the battery cell 20 could be improved, and the fire-fighting medium in the fire-fighting pipeline 13 could be more effectively utilized.

It should be understood that the protective component 14 in the embodiment of the present application may protect the second region 132, such that the second region 132 remains intact when the pressure relief mechanism 213 is actuated, and "intact" here may mean substantially intact. When the pressure relief mechanism 213 is actuated, the discharged high-temperature and high-pressure emissions would melt the first region 131 of the fire-fighting pipeline 13, and although the second region 132 is provided with the protective component 14, a small part of the second region 132 may be damaged. Therefore, the protective component 14 can keep the second region 132 intact, which may include protecting the second region 132 from being completely damaged, or may also include keeping the second region 132 substantially intact, that is, the second region 132 is substantially protected from being damaged. For example, a region of the second region 132 close to the first region 131 may be melted in a small range of several millimeters, but the embodiment of the present application is not limited thereto. Optionally, the fire-fighting pipeline 13 in the embodiment of the present application may be set to be any shape according to practical applications. For example, a cross-sectional shape of the fire-fighting pipeline 13 may be set to be any shape according to practical applications. Considering space utilization and convenience for installation, the fire-fighting pipeline 13 may be set as a flat pipeline as shown in FIG. 5, or may be set to be other shapes, such as a cylindrical pipeline. For ease of description, in the embodiment of the present application, a shape shown in FIG. 5 is taken as an example for description.

In addition, since each battery may include one or more battery cells 20, when the battery 10 includes a large number of battery cells 20, a plurality of battery cells 20 may be arranged in an array, for example, as shown in FIG. 5, the battery 10 including 2*9 battery cells 20 may be set. Correspondingly, the fire-fighting pipeline 13 provided above the battery cell 20 may be set as a corresponding shape. For example, for any one row of battery cells 20 in the battery 10, the fire-fighting pipeline 13 may be set as a straight communication pipeline provided above the battery cell 20, which is controlled by a group of valves. For any two adjacent rows of battery cells 20 as shown in FIG. 5, in order to save space and facilitate control, the fire-fighting pipeline 13 may be set as a U-shaped communication pipeline with one bend, which is controlled by a group of valves. Similarly, for adjacent three rows of battery cells 20 included in the battery 10, the fire-fighting pipeline 13 may also be set as an S-shaped communication pipeline with two bends, which is controlled by a group of valves. By analogy, for any more than three rows of adjacent battery cells 20 included in the battery 10, the fire-fighting pipeline 13 may be set as a curved communication pipeline with more bends, which may be controlled by a group of valves, or may be set as a plurality of communication pipelines respectively controlled by a plurality of groups of valves. For example, the plurality of communication pipelines may include at least one of a straight pipeline, a U-shaped pipeline or an S-shaped pipeline, but the embodiment of the present application is not limited thereto. For ease of description, the case where the fire-fighting pipeline 13 is a U-shaped pipeline is taken as an example for description.

In an embodiment of the present application, a group of valves includes an inlet valve and/or an outlet valve, the inlet valve is configured to fill a fire-fighting medium to the fire-fighting pipeline 13, and the outlet valve is configured to discharge the fire-fighting medium outwards. For example, the circulation of the fire-fighting medium in the fire-fighting pipeline 13 may be achieved by providing the inlet valve and the outlet valve at the same time, so that the fire-fighting pipeline 13 may also be used for cooling or heating when it is not damaged. In addition, the positions of the valves may be set according to practical applications.

Figure 6:
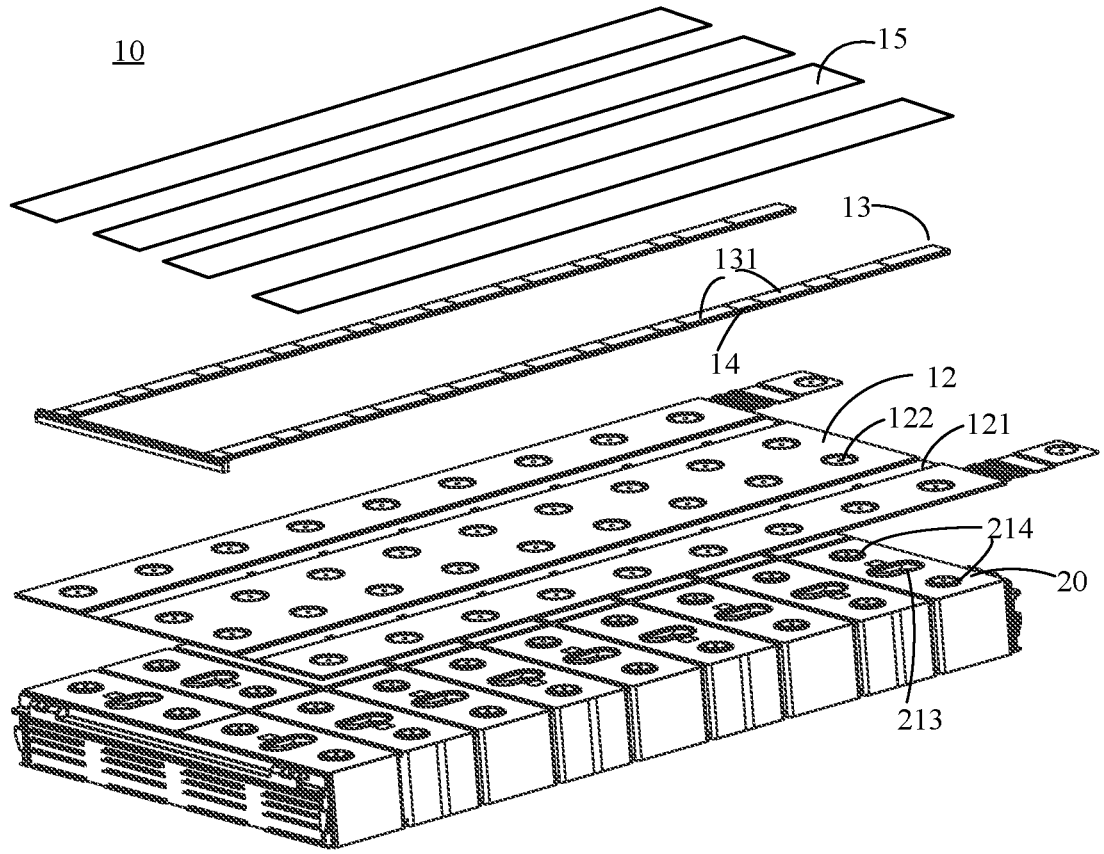

It should be understood that the position of the fire-fighting pipeline 13 in the embodiment of the present application is related to the position of the pressure relief mechanism 213, so that when the pressure relief mechanism 213 is actuated, the discharged emissions can melt the first region 131 of the fire-fighting pipeline 13. Specifically, FIG. 6 shows another schematic exploded view of a battery 10 according to an embodiment of the present application. As shown in FIG. 6, here, the case where a pressure relief mechanism 213 included in a battery cell 20 is disposed on the uppermost wall of the battery cell 20 shown in FIG. 6 is taken as an example, the wall is a cover plate of the battery cell 20, and the cover plate also includes an electrode terminal 214. As shown in FIG. 6, a fire-fighting pipeline 13 is arranged at a position corresponding to the pressure relief mechanism 213, which includes according to the position of the pressure relief mechanism 213, arranging the fire-fighting pipeline 13 at a side of the pressure relief mechanism 213 away from an interior of the battery cell 20, that is, the fire-fighting pipeline 13 can be arranged above the pressure relief mechanism 213 so that the fire-fighting pipeline 13 may at least partially cover the pressure relief mechanism 213. In this way, when the pressure relief mechanism 213 is actuated, the ejected emissions may damage the fire-fighting pipeline 13, so that the fire-fighting medium in the fire-fighting pipeline 13 may flow into the battery cell where thermal runaway occurs, through the pressure relief mechanism 213.

In addition, as shown in FIG. 6, the battery 10 may further include an insulating layer 12, the insulating layer 12 is disposed between the pressure relief mechanism 213 and the fire-fighting pipeline 13, and further, disposed between the pressure relief mechanism 213 and the protective component 14. For example, the insulating layer 12 in FIG. 6 is provided on a surface of the battery cell 20 shown in FIG. 5.

As shown in FIG. 6, when the pressure relief mechanism 213 is actuated, a material at a position corresponding to the insulating layer 12 covered above the pressure relief mechanism 213 can be quickly melted by emissions discharged from the pressure relief mechanism 213, to relieve an internal temperature and pressure of the battery cell 20. Therefore, a melting point of the material at the position on the insulating layer 12 corresponding to the pressure relief mechanism 213 is generally low.

It should be understood that the insulating layer 12 in the embodiment of the present application is used for insulation between the wall where the pressure relief mechanism 213 is located and the fire-fighting pipeline 13; the insulating layer 12 may also be configured to wrap a bus component, and the bus component is configured to implement electrical connection of electrode terminals 214 of different battery cells 20, for example, a bus component 122 is located at a position on the insulating layer 12 corresponding to the electrode terminal 214 in FIG. 6; the insulating layer 12 may also be configured to wrap other structures disposed on the surface of the wall where the pressure relief mechanism 213 is located. For example, the insulating layer 12 may also be configured to wrap a flexible printed circuit (Flexible Printed Circuit, FPC) board, and the FPC may be configured to monitor a state of each battery cell 20, for example, to monitor a temperature state or voltage state thereof, but the embodiment of the present application is not limited thereto.

Considering that one or more battery cells 20 may be provided in the battery 10, in the case where a large number of battery cells 20 are provided, there may be a large number of bus components or FPCs and other components connecting each battery cell 20, which have a large area, and therefore these components may be integrated through the insulating layer 12 to make the assembling of the plurality of battery cells 20 more convenient. For example, 2*9 battery cells 20 shown in FIG. 6 may be correspondingly provided with one insulating layer 12.

Optionally, as shown in FIG. 6, the battery 10 of the embodiment of the present application further includes an insulating protective layer 15 configured to protect the bus component 122. Specifically, when the thermal runaway occurs in the battery cell 20, the pressure relief mechanism 213 is actuated and discharges the emissions, and the emissions may melt the insulating layer 12 to expose the bus components 122, thereby causing the emissions or the fire-fighting medium in the fire-fighting pipeline 13 to flow to the bus component 122, and further causing the overlap and short circuit between the plurality of adjacent bus components 122 for connecting different battery cells. Therefore, the insulating protective layer 15 is set to protect the bus component 122 from the influence of the emissions or the fire-fighting medium in the fire-fighting pipeline 13. For example, an insulating and high-temperature resistant material may be selected for the insulating protective layer 15, and the insulating protective layer 15 may be disposed on a surface of the bus component 122 or disposed at a position on a surface of the insulating layer 12 corresponding to the bus component 122, to protect the bus component 122.

In addition, a shape and size of the insulating protective layer 15 in the embodiment of the present application may be set according to the practical applications. For example, considering that the plurality of battery cells 20 are generally arranged in an array as shown in FIG. 6, in order to facilitate installation, the insulating protective layer 15 may be set as a long strip shape as shown in FIG. 6, and each of the insulating protective layers 15 may be configured to cover and protect a row of bus components 122, but the embodiment of the present application is not limited thereto. Furthermore, the protective component 14 and the insulating protective layer 15 may be independent structures, for example, the insulating protective layer 15 may be attached to an upper surface of the protective component 14 through a connecting member, and the connecting member may be glue, etc. or, the protective component 14 and the insulating protective layer 15 may also be an integrally formed structure, and the embodiment of the present application is not limited thereto. In order to ensure the strength of the insulating protective layer 15, a thickness of the insulating protective layer 15 is greater than 0.1 mm.

It should be understood that the protective component 14 in the embodiment of the present application may include various forms, and batteries including different protective components 14 will be respectively illustrated below with reference to the accompanying drawings.

Optionally, as a first embodiment, as shown in FIGS. 5 to 7, the protective component 14 may be a component only provided in the second region 132 of the fire-fighting pipeline 13. Specifically, taking FIGS. 6 and 7 as an example, the protective component 14 may be disposed between the second region 132 of the fire-fighting pipeline 13 and the battery cell 20, and configured to protect the second region 132 when the pressure relief mechanism 213 is actuated, for example, the protective component 14 may be wrapped on a surface of the second region 132.

Specifically, as shown in FIG. 6 and FIG. 7, when the protective component 14 is set as a component that wraps the second region 132, the protective component 14 and the fire-fighting pipeline 13 are still in a shape of a pipeline as a whole, and therefore the protective component 14 and the fire-fighting pipeline 13 may be installed by setting a recess. As shown in FIG. 6, a second recess 121 may be provided in a region of the insulating layer 12 corresponding to the pressure relief mechanism 213, and the fire-fighting pipeline 13 wrapped by the protective component 14 is disposed in the second recess 121.

In order to ensure that the emissions discharged by the pressure relief mechanism 213 can quickly and effectively damage the first region 131 of the fire-fighting pipeline 13, the fire-fighting pipeline 13 is generally disposed right above the pressure relief mechanism 213, so that the first region 131 directly faces the pressure relief mechanism 213. For example, the pressure relief mechanism 213 is generally axisymmetric, and an axis of the pressure relief mechanism 213 is perpendicular to and lies in a same plane as an axis of the corresponding first region 131; that is, the first region 131 directly faces the pressure relief mechanism 213. For example, as shown in FIG. 6, the second recess 121 is disposed right above the pressure relief mechanism 213, and the fire-fighting pipeline 13 is disposed in the second recess 121 to ensure that the fire-fighting pipeline 13 is disposed right above the pressure relief mechanism 213.

Optionally, in order to enable the protective component 14 to protect the second region 132 when the pressure relief mechanism 213 is actuated, a melting point of a material of the protection part 14 should be greater than a melting point of a material of the fire-fighting pipeline 13. Specifically, a material with a higher melting point is generally selected for the protective component 14. For example, a melting point of a material of the protective component 14 is greater than or equal to 800° C., and the material of the protective component 14 may be mica, quartz, etc., but the embodiment of the present application is not limited thereto.

The first region 131 and the second region 132 included in the fire-fighting pipeline 13 in an embodiment of the present application will be described below. Specifically, the division of the first region 131 and the second region 132 may be for the entire fire-fighting pipeline 13, or may also be for a side of the fire-fighting pipeline 13 facing the battery cell 20. For example, in combination with FIG. 6 and FIG. 7, the first region 131 in the embodiment of the present application may be a segment of pipeline in the fire-fighting pipeline 13 corresponding to the pressure relief mechanism 213, that is, the first region 131 is a segment of pipeline directly facing the pressure relief mechanism 213, or the first region 131 may also refer to a region on the surface of the fire-fighting pipeline 13 facing the battery cell 20 corresponding to the pressure relief mechanism 213, that is, the first region 131 is a region directly facing the pressure relief mechanism 213; similar to the division manner of the first region 131, the second region 132 is located at the periphery of the first region 131, that is, each second region 132 is a segment of pipeline adjacent to the first region 131, or each second region 132 is a region adjacent to the first region 131. In addition, when the first region 131 represents a segment of pipeline, the second region 132 may refer to either a segment of pipeline or a region; and when the first region 131 represents a region, the second region 132 may refer to either a segment of pipeline or a region, which is not limited thereto. However, for ease of description, the case where both the first region 131 and the second region 132 represent a segment of pipeline is taken as an example.

In addition, in an embodiment of the present application, the second region 132 located at the periphery of the first region 131 may include a plurality of division manners. Specifically, for ease of description, as shown in FIG. 7, in an embodiment of the present application, an extending direction of the fire-fighting pipeline 13 is defined as the X direction, that is, an axis direction of the fire-fighting pipeline 13 is defined as the X direction. As shown in FIG. 7, two ends of any segment of the first region 131 along the X direction is provided with second regions 132, but the sizes of the second regions 132 may be set to be different, so a segment of second region 132 (for example, as shown in FIG. 7) or two segments of discontinuous second regions 132 may be provided between two continuous first regions 131 along the X direction, and each second region 132 is respectively adjacent to the corresponding first region 131.

However, for ease of description, the division manner in FIG. 7 is taken as an example for description, that is, two ends of any one segment of the first region 131 along the X direction are second regions 132, and a segment of pipeline between two continuous first regions 131 corresponding to the pressure relief mechanisms 213 of any two adjacent battery cells 20 along the X direction is the second region 132; and similarly, two ends of any one segment of the second region 132 along the X direction are the first regions 131.

Optionally, lengths of the first region 131 and the second region 132 along the X direction in an embodiment of the present application may be set according to the practical applications, and the embodiment of the present application is not limited thereto. For example, a length of the first region 131 along the X direction may be set according to a size of the pressure relief mechanism 213, or may be set according to a distance between the fire-fighting pipeline 13 and the pressure relief mechanism 213. For example, the length of the first region 131 along the X direction may be greater than or equal to the length of the pressure relief mechanism 213 along the X direction, and the second region 132 is a pipeline of the fire-fighting pipeline 13 between two first regions 131 corresponding to two adjacent pressure relief mechanisms 213.

Figure 8:
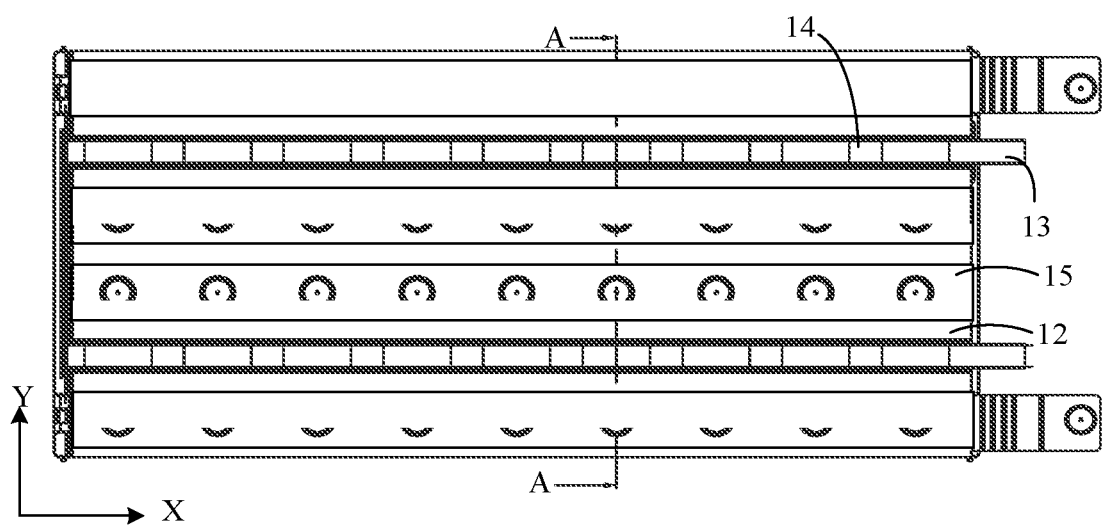
FIG. 8 is a top view of a battery according to an embodiment of the present application.

It should be understood that a width of the fire-fighting pipeline 13 in an embodiment of the present application may be set according to the practical applications. For example, FIG. 8 shows a top view of a battery 10 including a fire-fighting pipeline 13 and a battery cell 20, that is, FIG. 8 is a top view of the battery 10 shown in FIG. 6 after installation. As shown in FIG. 8, for ease of explanation, a direction perpendicular to the X direction is referred to as a first direction and is denoted as the Y direction. In combination with FIG. 6 and FIG. 8, it can be seen that since the fire-fighting pipeline 13 is disposed in the second recess 121 of the insulating layer 12, in the Y direction, a width of the fire-fighting pipeline 13 is less than or equal to a width of the second recess 121. In the Y direction, a width of the insulating protective layer 15 may be set according to the practical applications, for example, the width of the insulating protective layer 15 may be set according to a width of the bus component 122 along the Y direction.

Figure 9:
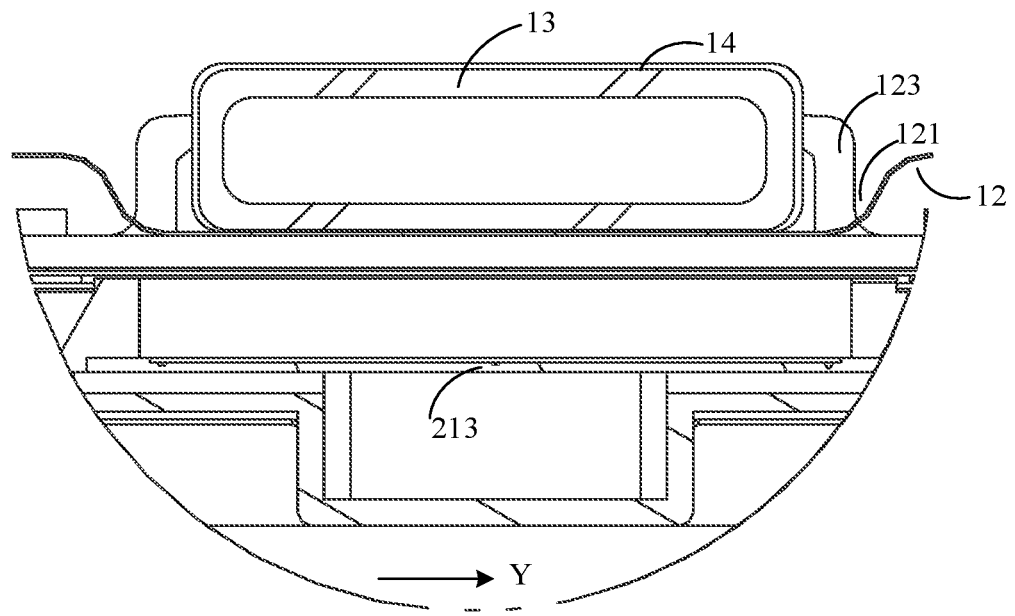
FIG. 9 is a partial enlarged view of a cross-sectional view of the battery shown in FIG. 8 along a direction of A-A.

In addition, FIG. 9 is a partial enlarged view of a cross-sectional view of the battery 10 shown in FIG. 8 along the direction A-A shown in FIG. 8. As shown in FIG. 9, in order to ensure that the pressure relief mechanism 213 can successfully damage the first region 131 of the fire-fighting pipeline 13, in the Y direction, the width of the pressure relief mechanism 213 is generally set to be greater than or equal to the width of the fire-fighting pipeline 13, so as to easily damage the fire-fighting pipeline 13, but the embodiment of the present application is not limited thereto.

Optionally, as shown in FIG. 9, in order to be able to fix the fire-fighting pipeline 13 provided with the protective component 14, a fixing member 123 may be provided on the insulating layer 12. Specifically, the fixing member 123 may be provided in the second recess 121 on the insulating layer 12, and the fixing member 123 is configured to fix the fire-fighting pipeline 13 having the protective component 14. Optionally, the fixing member 123 may be any structure capable of fixing the fire-fighting pipeline 13, for example, as shown in FIGS. 8 and 9, the fixing member 123 may be a buckle, but the embodiment of the present application is not limited thereto.

In the foregoing description, the case where the protective component 14 is a structure disposed in the second region 132 in segments is taken as an example. In contrast, the protective component 14 may also be an integral structure disposed between the pressure relief mechanism 213 and the fire-fighting pipeline 13.

Figure 10:
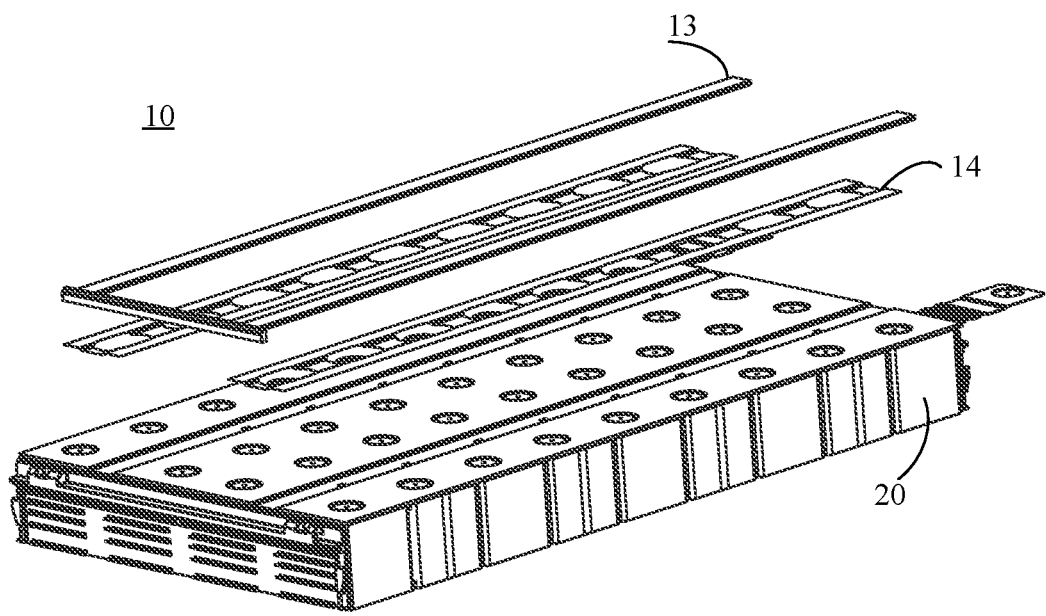
FIG. 10 is a schematic exploded view of a battery according to another embodiment of the present application.

Optionally, as a second embodiment which is different from the first embodiment in which the protective component 14 is a plurality of separate structures, for example, each separate structure is only configured to protect a segment of the second region 132 in the fire-fighting pipeline 13, and the protective component 14 in an embodiment of the present application may also be one or more continuous structures, and each continuous structure may protect a plurality of segments of the second region 132 in the fire-fighting pipeline 13. For example, FIG. 10 shows a schematic exploded view of a battery 10 according to a second embodiment of the present application. As shown in FIG. 10, a protective component 14 may be disposed between a fire-fighting pipeline 13 and a pressure relief mechanism 213 (not shown in FIG. 10). For the description of the remaining parts in FIG. 10 except the protective component 14, reference may be made to the related content in FIG. 5, which will not be repeated here for brevity.

Figure 11:
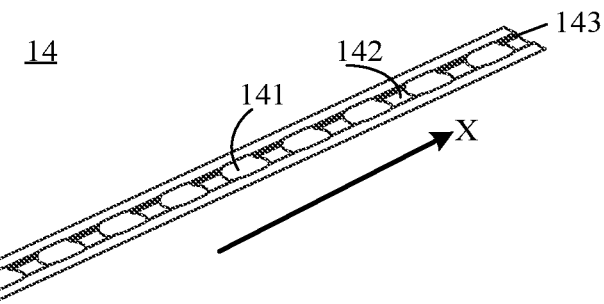
FIG. 11 is a schematic diagram of a protective component according to another embodiment of the present application.

The protective component 14 in FIG. 10 will be described in detail with reference to the accompanying drawings. Specifically, FIG. 11 shows a schematic diagram of the protective component 14 in FIG. 10. As shown in FIG. 11, in the case where the fire-fighting pipeline 13 is still divided into the first region 131 and the second region 132 as shown in FIG. 7, correspondingly, along the X direction, the protective component 14 may include a protective zone 142 and a weakened zone 141. Specifically, with reference to FIGS. 7, 10 and 11, the weakened zone 141 corresponds to the first region 131, and the protective zone 142 corresponds to the second region 132. Optionally, the protective zone 142 is a zone other than the weakened zone 141. After the protective component 14 and the fire-fighting pipeline 13 are installed, the protective zone 142 covers the second region 132, for example, the protective zone 142 can cover a region of a side of the second region 132 toward the battery cell 20, and the protective zone 142 is configured to protect the second region 132 of the fire-fighting pipeline 13 when the pressure relief mechanism 213 is actuated, and the weakened zone 141 covers the first region 131 and is disposed opposite to the pressure relief mechanism 213, and the weakened zone 141 is configured such that emissions from the battery cell 20 are capable of passing through the weakened zone 141 to damage the first region 131 when the pressure relief mechanism 213 is actuated. In this way, when the pressure relief mechanism 213 is actuated, it can be ensured that the first region 131 of the fire-fighting pipeline 13 is damaged and the second region 132 remains intact, and the fire-fighting medium in the second region 132 flows to the first region 131, and passes through the first region 131 and then flows out to the battery cell where thermal runaway occurs, thus achieving the effect of temperature reduction and heat dissipation.

Optionally, the weakened zone 141 in an embodiment of the present application may be a through hole or be made of a material with a lower melting point, so as to ensure that the emissions from the battery cell 20 pass through the weakened zone via the pressure relief mechanism 213 to damage the first region 131; on the contrary, the protective zone 142 is made of a material with a higher melting point to ensure that it is not melted by the emissions from the battery cell 20, thereby protecting the second region 132. Specifically, a melting point of a material of the protection part 14 at the protective zone 142 should be greater than a melting point of a material of the fire-fighting pipeline 13. For example, a melting point of a material of the protective component 14 is greater than or equal to 800° C., and the material of the protective component 14 may be mica, quartz, etc., but the embodiment of the present application is not limited thereto.

It should be understood that, as shown in FIG. 11, the protective component 14 is also provided with a first recess 143, and the fire-fighting pipeline 13 is disposed in the first recess 143, and the weakened zone 141 is provided in a region on a bottom wall of the first recess 143 corresponding to the first region 131. The first recess 143 may be configured to collect the fire-fighting medium used to flow into the battery cell 20 when the pressure relief mechanism 213 is actuated.

Figure 12:
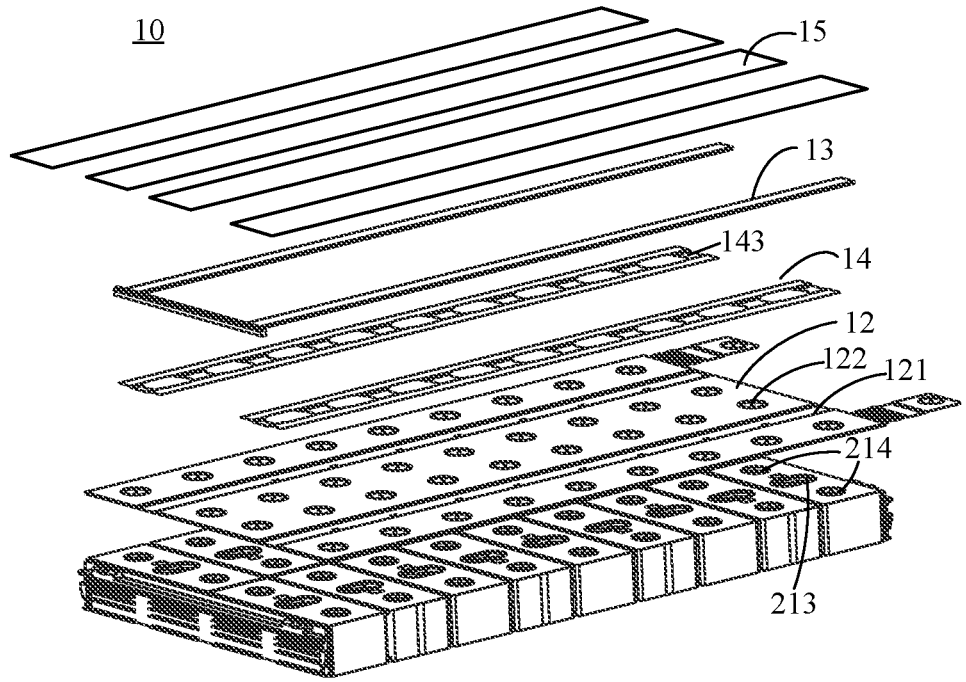
FIG. 12 is another schematic exploded view of a battery according to another embodiment of the present application.

FIG. 12 shows another schematic exploded view of a battery 10 according to a second embodiment of the present application. As shown in FIG. 12, a fire-fighting pipeline 13 may be fixed in a first recess 143 of a protective component 14, and the fire-fighting pipeline 13 and the protective component 14 may be fixed in a second recess 121 of an insulating layer 12, and an insulating protective layer 15 covers a region on a surface of the insulating layer 12 corresponding to a bus component 122. Specifically, the insulating layer 12 in FIG. 12 may correspond to the insulating layer 12 in FIG. 6, that is, the related description of the insulating layer 12 in FIG. 6 is applicable to the insulating layer 12 in FIG. 12, which will not be repeated here for brevity. Furthermore, an upper surface of the battery cell 20 shown in FIG. 11 is provided with the insulating layer 12 shown in FIG. 12.

As shown in FIG. 12, the insulating layer 12 is provided with the second recess 121 corresponding to the pressure relief mechanism 213, so that the protective component 14 installed with the fire-fighting pipeline 13 is disposed in the second recess 121.

Figure 13:
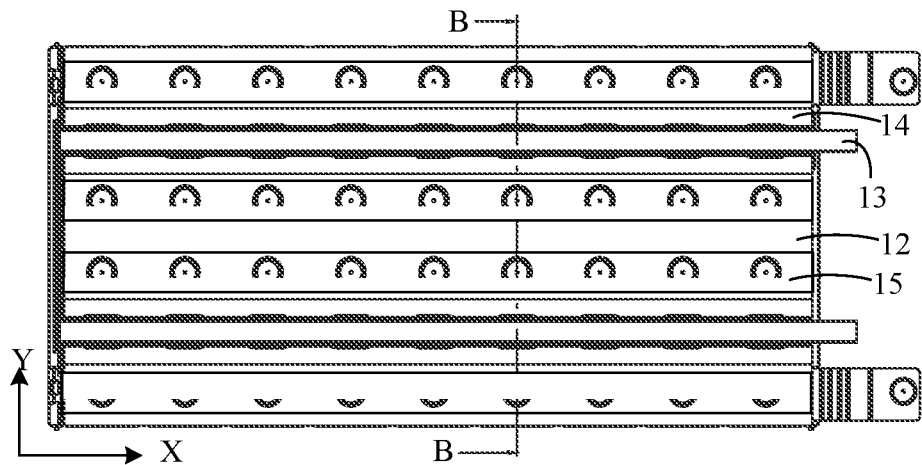
FIG. 13 is a top view of a battery according to another embodiment of the present application.

It should be understood that, similar to the first embodiment, in order to ensure that the emissions discharged from the pressure relief mechanism 213 can quickly and effectively pass through the weakened zone 141 to damage the first region 131 of the fire-fighting pipeline 13, the weakened zone 141 should be disposed right above the pressure relief mechanism 213, and meanwhile the first region 131 directly faces the pressure relief mechanism 213. For example, FIG. 13 shows a top view of a battery 10 according to a second embodiment of the present application. In combination with FIGS. 10 and 13, the pressure relief mechanism 213 is generally axisymmetric, and an axis of the pressure relief mechanism 213 is perpendicular to and lies in a same plane as an axis of the corresponding first region 131; that is, the first region 131 directly faces the pressure relief mechanism 213. In addition, an orthographic projection of the weakened zone 141 on a first plane covers an orthographic projection of the pressure relief mechanism 213 on the first plane, so that the weakened zone 141 also directly faces the pressure relief mechanism 213, or it can cover the pressure relief mechanism 213, where the first plane is parallel to an upper or lower surface of the wall where the pressure relief mechanism 213 of the battery cell 20 is located, the upper surface is a surface away from an interior of the battery cell 20, and the lower surface is a surface toward the interior of the battery cell 20.

In the embodiment of the present application, the size of the fire-fighting pipeline 13 and the size of the protective component 14 can be set according to the practical applications. In combination with FIG. 12 and FIG. 13, it can be seen that since the fire-fighting pipeline 13 is disposed in the first recess 143 of the protective component 14 and the protective component 14 is disposed in the second recess 121 of the insulating layer 12, in the Y direction, a width of the fire-fighting pipeline 13 is less than or equal to a width of a bottom wall of the first recess 143, and the width of the bottom wall of the first recess 143 is less than or equal to a width of a bottom wall of the second recess 121. In addition, in the Y direction, a width of the insulating protective layer 15 may be set according to the practical applications, for example, the width of the insulating protective layer 15 may be set according to a width of the bus component 122 along the Y direction. In this case, when the widths of the fire-fighting pipelines 13 are inconsistent, the width of the fire-fighting pipeline 13 may refer to a width at a position where the fire-fighting pipeline 13 is the smallest width in the Y direction.

In addition, in order to make the emissions discharged from the pressure relief mechanism 213 quickly and accurately pass through the weakened zone 141 to break through the first region 131, in the Y direction, a width of the weakened zone 141 is generally larger than a diameter of the fire-fighting pipeline 13; however in the Y direction, the width of the weakened zone 141 may be greater than, less than or equal to a width of a bottom wall of the first recess 143. For example, as shown in FIG. 13, the width of the weakened zone 141 may be greater than the width of the bottom wall of the first recess 143, so that the first region 131 may be fully exposed through the weakened zone 141, thus ensuring that the first region 131 is more easily damaged when the pressure relief mechanism 213 is actuated, but the embodiment of the present application is not limited thereto.

Figure 14:
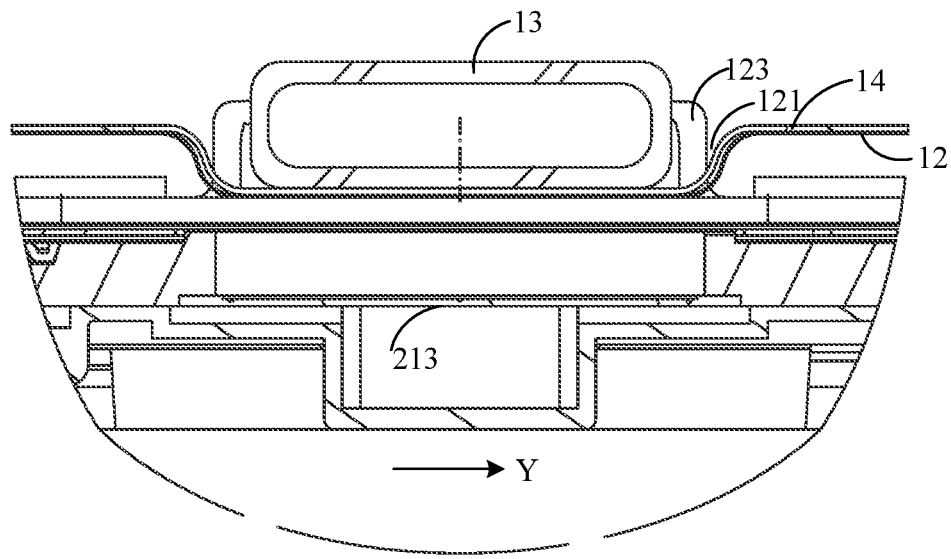
FIG. 14 is a partial enlarged view of a cross-sectional view of the battery shown in FIG. 13 along a direction of B-B.

FIG. 14 is a partial enlarged view of a cross-sectional view of the battery 10 shown in FIG. 13 along the direction B-B shown in FIG. 13. As shown in FIG. 14, in order to ensure that the pressure relief mechanism 213 can damage the first region 131 of the fire-fighting pipeline 13, in the Y direction, the width of the pressure relief mechanism 213 is generally set to be greater than or equal to the width of the fire-fighting pipeline 13, but the embodiment of the present application is not limited thereto.

In addition, similar to FIG. 9, in order to be able to fix the fire-fighting pipeline 13 provided with the protective component 14, a fixing member 123 may also be provided on the insulating layer 12, which will not be repeated here for brevity.

Therefore, the battery 10 of an embodiment of the present application may include one or more battery cells 20, the battery cell 20 is provided with a pressure relief mechanism 213, and the pressure relief mechanism 213 may be actuated when an internal temperature or pressure of the battery cell 20 exceeds a threshold, to relieve the internal pressure or temperature; a fire-fighting pipeline 13 is provided at a position corresponding to the pressure relief mechanism 213, and when the pressure relief mechanism 213 is actuated, emissions discharged from the pressure relief mechanism 213 may damage the fire-fighting pipeline 13, so that a fire-fighting medium accommodated in the fire-fighting pipeline 13 flows out from a damaged position and flows to the pressure relief mechanism 213 so as to lower a temperature of the battery cell 20; meanwhile, a protective component 14 is provided between the fire-fighting pipeline 13 and the battery cell 20, and the protective component 14 may protect a second region 132 on the fire-fighting pipeline 13 located at a periphery of a first region 131 corresponding to the pressure relief mechanism 13, so that the pressure relief mechanism 213 only damages the first region 131 of the fire-fighting pipeline 13 corresponding to the pressure relief mechanism 213, and further a position where the fire-fighting medium in the fire-fighting pipeline 13 flows out is concentrated in a position corresponding to the pressure relief mechanism 213, in this way, the heat dissipation efficiency of the battery cell 20 could be improved, and the fire-fighting medium in the fire-fighting pipeline 13 could be more effectively utilized.

An embodiment of the present application further provides a power consumption device, which may include the battery 10 in each of the foregoing embodiments. Optionally, the power consumption device may be a vehicle 1, a ship or a spacecraft.

The battery and the power consumption device of the embodiment of the present application are described above, and a method and a device for producing a battery of an embodiment of the present application will be described below. For the parts that are not described in detail, reference is made to the foregoing embodiments.

Figure 15:
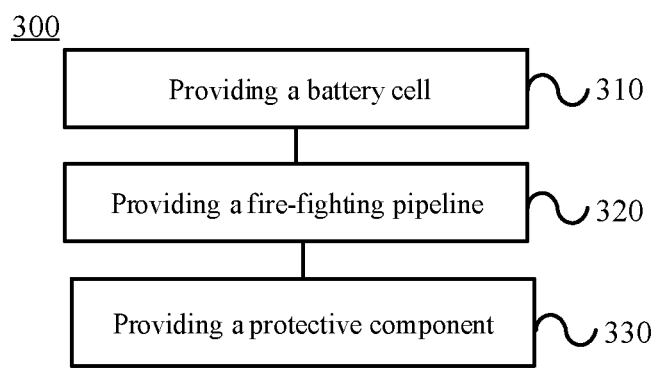
FIG. 15 is a schematic flowchart of a method for producing a battery according to an embodiment of the present application.

FIG. 15 shows a schematic flowchart of a method 300 for producing a battery according to an embodiment of the present application. As shown in FIG. 15, the method 300 may include: 310, providing a battery cell 20, the battery cell 20 including a pressure relief mechanism 213 configured to be actuated when an internal pressure or temperature of the battery cell 20 reaches a threshold, to relieve the internal pressure or temperature; 320, providing a fire-fighting pipeline 13, the fire-fighting pipeline 13 being configured to accommodate a fire-fighting medium, the fire-fighting pipeline 13 including a first region 131 corresponding to the pressure relief mechanism 213 and a second region 132 located at a periphery of the first region 131, the first region 131 being configured to be damaged when the pressure relief mechanism 213 is actuated, such that the fire-fighting medium is discharged, and the second region 132 being configured to remain intact when the pressure relief mechanism 213 is actuated, such that the fire-fighting medium is capable of flowing from the second region 132 to the first region 131; and 330, providing a protective component 14, the protective component 14 being disposed between the fire-fighting pipeline 13 and the battery cell 20, and the protective component 14 being configured to protect the second region 132.

Figure 16:
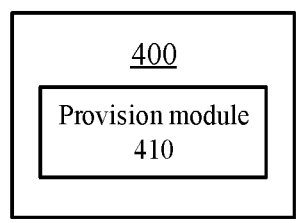
FIG. 16 is a schematic block diagram of a device for producing a battery according to an embodiment of the present application.

FIG. 16 shows a schematic block diagram of a device 400 for producing a battery according to an embodiment of the present application. As shown in FIG. 16, the device 400 for producing a battery may include a provision module 410. The provision module 410 is configured to: provide a battery cell 20, the battery cell 20 including a pressure relief mechanism 213 configured to be actuated when an internal pressure or temperature of the battery cell 20 reaches a threshold, to relieve the internal pressure or temperature; provide a fire-fighting pipeline 13, the fire-fighting pipeline 13 being configured to accommodate a fire-fighting medium, the fire-fighting pipeline 13 including a first region 131 corresponding to the pressure relief mechanism 213 and a second region 132 located at a periphery of the first region 131, the first region 131 being configured to be damaged when the pressure relief mechanism 213 is actuated, such that the fire-fighting medium is discharged, and the second region 132 being configured to remain intact when the pressure relief mechanism 213 is actuated, such that the fire-fighting medium is capable of flowing from the second region 132 to the first region 131; and provide a protective component 14, the protective component 14 being disposed between the fire-fighting pipeline 13 and the battery cell 20, and the protective component 14 being configured to protect the second region 132.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions do not make the nature of the respective technical solutions depart from the spirit and scope of the technical solutions of the embodiments of the present application.

What is claimed is:

1. A battery, comprising:
a battery cell, the battery cell comprising a pressure relief mechanism, the pressure relief mechanism configured to be actuated when an internal pressure or temperature of the battery cell reaches a threshold, to relieve the internal pressure or temperature, the pressure relief mechanism is disposed on a wall of the battery cell;
a fire-fighting pipeline configured to accommodate a fire-fighting medium, the fire-fighting pipeline is arranged on a side of the pressure relief mechanism away from an interior of the battery cell, the fire-fighting pipeline comprising a first region corresponding to the pressure relief mechanism and a second region located at a periphery of the first region, the first region being configured to be damaged when the pressure relief mechanism is actuated, such that the fire-fighting medium is discharged, and the second region being configured to remain intact when the pressure relief mechanism is actuated, such that the fire-fighting medium is capable of flowing from the second region to the first region; and
a protective component disposed between the fire-fighting pipeline and the battery cell and configured to protect the second region ;
wherein the protective component comprises a weakened zone and a protective zone, the protective zone is configured to protect the second region of the fire-fighting pipeline when the pressure relief mechanism is actuated, the weakened zone is disposed opposite to the pressure relief mechanism, and the weakened zone is configured such that emissions from the battery cell are capable of passing through the weakened zone to damage the first region when the pressure relief mechanism is actuated;
wherein a first recess is provided on the protective component, the fire-fighting pipeline is disposed in the first recess, and the first recess is configured to collect the fire-fighting medium used to flow into the battery cell when the pressure relief mechanism is actuated;
wherein the weakened zone is provided in a region on a bottom wall of the first recess corresponding to the first region;
wherein a melting point of a material of the protective zone is greater than a melting point of a material of the fire-fighting pipeline; and
a melting point of a material of the protective zone is greater than or equal to 800° C.

2. The battery according to claim 1, wherein a width of the weakened zone in a first direction is greater than or equal to a width of the bottom wall of the first recess in the first direction, and the first direction is perpendicular to an axis of the fire-fighting pipeline in the first region.

3. The battery according to claim 1, wherein a width of the weakened zone in a first direction is greater than a diameter of the fire-fighting pipeline, and the first direction is perpendicular to an axis of the fire-fighting pipeline in the first region.

4. The battery according to claim 1, wherein an orthographic projection of the weakened zone on a first plane covers an orthographic projection of the pressure relief mechanism on the first plane, and the first plane is parallel to a surface of a wall where the pressure relief mechanism of the battery cell is located facing toward an interior of the battery cell.

5. The battery according to claim 1, wherein the fire-fighting pipeline is disposed on one side of the pressure relief mechanism away from an interior of the battery cell; the pressure relief mechanism is an axisymmetric structure, and an axis of the fire-fighting pipeline in the first region is perpendicular to and lies in a same plane as an axis of the pressure relief mechanism.

6. The battery according to claim 1, wherein a material of the protective zone is mica or quartz.

7. The battery according to claim 1, wherein the battery further comprises:
   a bus component configured to implement electrical connection of a plurality of battery cells; and
   an insulating protective layer configured to cover the bus component to prevent emissions from the battery cell from short-circuiting the plurality of battery cells when the pressure relief mechanism is actuated, and a thickness of the insulating protective layer is greater than 0.1 mm;
   a melting point of a material of the insulating protective layer is greater than or equal to 800° C.; and/or
   a material of the insulating protective layer is mica or quartz.

8. The battery according to claim 1, wherein the battery further comprises:
   an insulating layer disposed between the pressure relief mechanism and the protective component.

9. The battery according to claim 8, wherein the insulating layer is configured to wrap a bus component of the battery, and an insulating protective layer is provided in a region on a surface of the insulating layer corresponding to the bus component,
   wherein the bus component is configured to implement electrical connection of a plurality of battery cells, and the insulating protective layer is configured to cover the bus component to prevent emissions from the battery cell from short-circuiting the plurality of the battery cells when the pressure relief mechanism is actuated.

10. The battery according to claim 9, wherein the protective component and the insulating protective layer are an integrally formed structure.

11. The battery according to claim 10, wherein a second recess is provided in a region of the insulating layer corresponding to the pressure relief mechanism, and the protective component is disposed in the second recess.

12. The battery according to claim 11, wherein a first recess on the protective component is disposed in the second recess, the fire-fighting pipeline is disposed in the first recess, and the first recess is configured to collect the fire-fighting medium used to flow into the battery cell when the pressure relief mechanism is actuated.

13. The battery according to claim 12, wherein a fixing member is provided in the second recess, and the fixing member is configured to fix the protective component and the fire-fighting pipeline.

14. The battery according to claim 8, wherein a melting point of a material of the insulating layer is lower than a melting point of the protective component, and the insulating layer is melted by emissions from the battery cell when the pressure relief mechanism is actuated.

15. A power consumption device, comprising the battery according to claim 1, wherein the battery is configured to provide electrical energy.

\* \* \* \* \*